United States Patent [19]

David

[11] 4,202,442
[45] May 13, 1980

[54] CONVEYOR

[75] Inventor: Joseph S. David, Franklin, Pa.

[73] Assignee: Joy Manufacturing Company, Pittsburgh, Pa.

[21] Appl. No.: 823,320

[22] Filed: Aug. 10, 1977

[51] Int. Cl.² ............................................. B65G 15/08
[52] U.S. Cl. ..................................... 198/820; 198/844
[58] Field of Search ............... 198/300, 303, 365, 678, 198/680, 820–822, 818, 860–862, 864, 844, 850, 839, 796, 802, 845, 837, 838; 299/18, 43–45, 56, 64–67; 24/31 R, 35, 37

[56] References Cited

U.S. PATENT DOCUMENTS

| 389,242 | 9/1888 | Palmer | 198/839 |
| 476,787 | 6/1892 | Dale | 198/821 |
| 640,103 | 12/1899 | Cowley | 198/821 |
| 706,294 | 8/1902 | Beck | 198/818 |
| 3,286,811 | 11/1966 | McWilliams | 198/365 |
| 3,349,893 | 10/1967 | Jordan et al. | 198/822 |

FOREIGN PATENT DOCUMENTS

| 860921 | 12/1952 | Fed. Rep. of Germany | 198/818 |
| 16808M | 12/1956 | Fed. Rep. of Germany | 198/680 |
| 970459 | 9/1958 | Fed. Rep. of Germany | 198/850 |
| 1182570 | 6/1959 | France | 198/365 |

Primary Examiner—Joseph E. Valenza
Attorney, Agent, or Firm—J. Stewart Brams

[57] ABSTRACT

A conveying device including an endless, side discharging conveying element with improved supporting and discharge actuating means therefor.

9 Claims, 8 Drawing Figures

CONVEYOR

BACKGROUND OF THE INVENTION

In the conveying arts it is well known to provide conveyor devices for continuous conveying of material, especially lump or granular materials such as coal, from one point to another. For example, in underground coal mining the mined coal typically must be transported from the mine face to a main haulage system remote from the face as mining proceeds. Among the various continuous conveyor systems proposed for this purpose have been those including an endless conveying element such as a flexible troughed belt trained for orbital travel about a closed loop path defining an upper conveying traverse overlying a lower inverted return traverse of the belt. Another conveyor system especially well adapted for transporting material in restricted spaces such as low coal mines comprises a flexible, endless conveying element including a deeply troughed conveyor belt which is driven in a generally horizontally extending closed loop path to define laterally side-by-side conveying and return traverses thereof extending longitudinally adjacent the laterally opposite sides of an elongated support frame assembly. The deeply troughed belt is thus maintained continuously upwardly open throughout a major part of both the conveying and return traverses thereof. The horizontal loop conveyor minimizes coal spillage and is well adapted for use in restricted head room inasmuch as its total vertical height corresponds to that of a single belt traverse rather than the two stacked or overlying traverses of conventional troughed belt conveyor systems. Such a horizontal loop conveyor system is disclosed in copending U.S. patent application Ser. No. 862,254, filed Dec. 19, 1977, the specification of which is incorporated herein by reference. The assignee in application Ser. No. 862,254 is the same as the assignee in the instant application.

As described in the hereinabove cited copending application, that portion of the troughed conveyor belt which is passing through a predetermined discharge zone or portion of the endless loop path is caused to twist about a longitudinally extending axis from the upright or upwardly open material carrying orientation to a side discharge orientation for discharge of the material carried therein. The present invention provides improved means for effecting such side discharge of an elongated flexible conveying element, as well as other improvements in the support and assembly of such a horizontal loop conveying element as disclosed in the following specification with reference to the accompanying figures in which:

Figure 1:
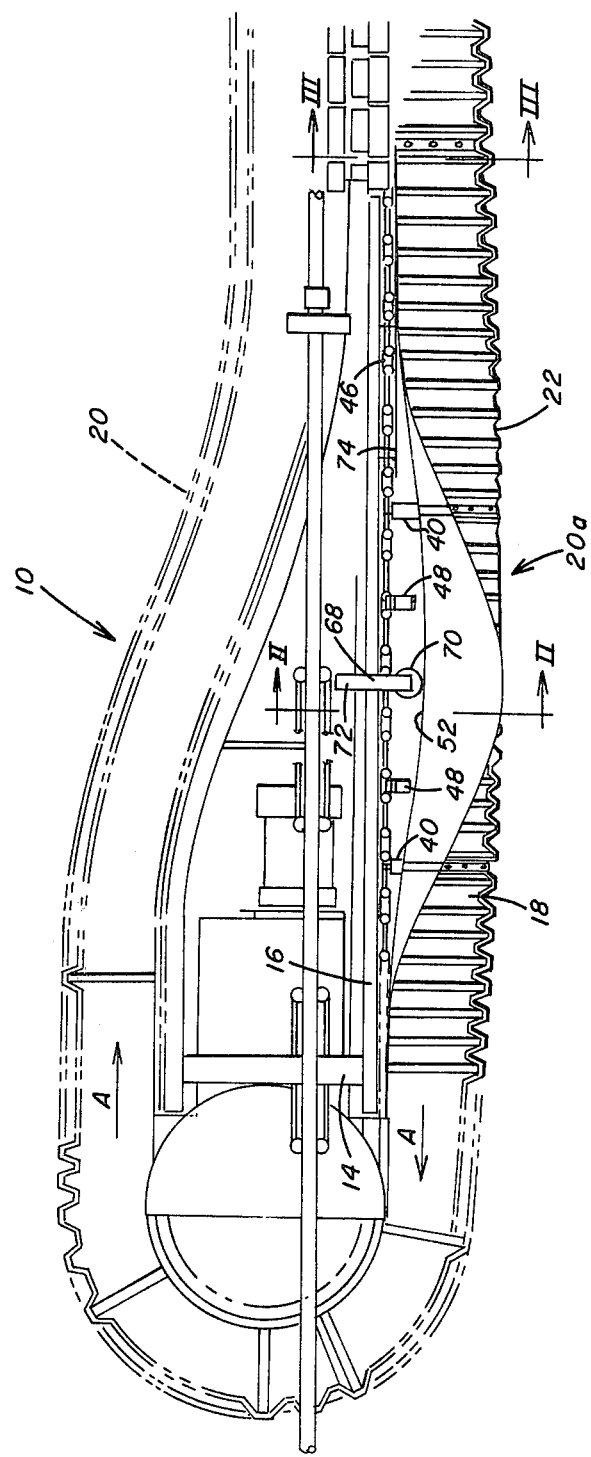
FIG. 1 is a top plan view of a portion of a horizontal loop conveying apparatus including a troughed conveying member which passes through a discharge zone, and including discharge and support means according to certain preferred embodiments of the instant invention.
Figure 3:
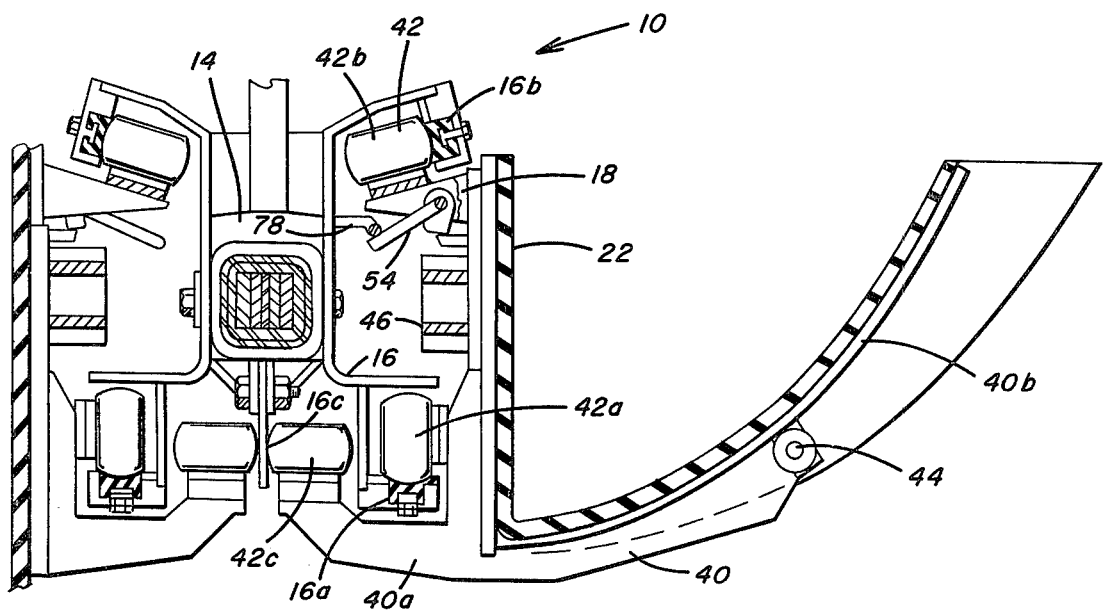
FIG. 3 is a partial transverse section taken on line 3—3 of FIG. 1 showing the conveying element in its upright or carrying orientation and a conveying element discharge latch means constructed according to one embodiment of the instant invention.
Figure 2:
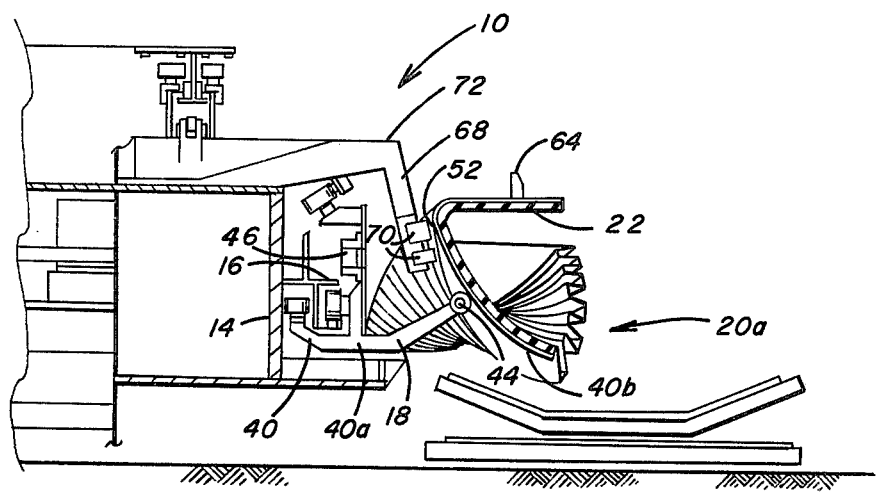
FIG. 2 is a partial transverse section of the conveying apparatus of FIG. 1 taken on line 2—2 of FIG. 1 and showing the troughed conveying element in its dumping or discharge orientation.

There is generally indicated at 10 in FIGS. 1, 2 and 3 one end portion of a conveying apparatus which includes an elongated frame 14 having an endless guideway means 16 that supports an endless conveying element assembly 18 for orbital travel about a generally horizontally extending endless loop path designated as 20 and only a portion of which is shown. Endless path 20 includes a discharge zone or portion generally indicated at 20a wherein a troughed conveyor member such as a flexible belt portion 22 of conveying element 18 is caused to twist with respect to the longitudinally adjacent portions of belt 22 from its upwardly open conveying orientation to a side opening or discharge orientation for discharge of the material carried therein. The overall structure and operation of conveyor apparatus 10 are more fully and completely described in the hereinabove cited copending application Ser. No. 701,770.

Figure 4:
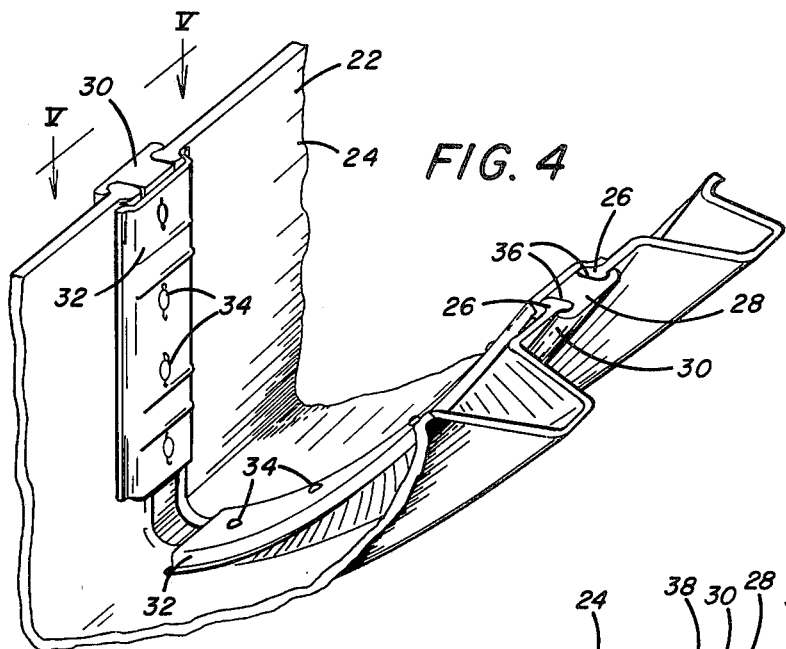
FIG. 4 is a perspective view of a fragmentary portion of the conveying member showing a conveyor pan or sector joint.
Figure 5:
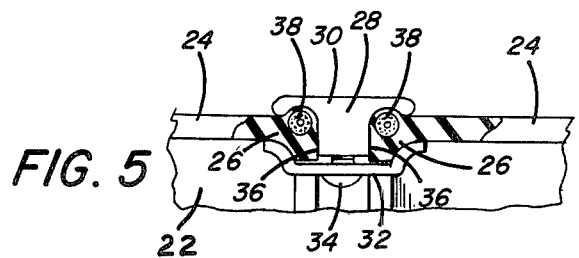
FIG. 5 is a fragmentary, partially sectioned top plan view from line 5—5 of FIG. 4.

To provide the requisite flexibility for belt twisting upon side discharge belt 22 may be assembled from a plurality of elongated molded elastomer belt or pan sections 24 joined end to end by such securing means as shown in FIGS. 4 and 5. The longitudinal ends of pans 24 include reinforcements such as integrally molded bead portions 26 which are captively releasably retained with respect to the ends of the adjacent pans 24 as by a clamping means 28 including a formed, rigid clamp body 30 and one or more elongated, cooperably formed clamping plates 32 which extend adjacent portions of clamp body 30 and are releasably secured thereto as by removable threaded fasteners 34. Clamp body 30 and plates 32, when secured together as shown, define a pair of elongated channels 36 which receive the respective beads 26 of the adjacent pans therein such that upon selective loosening or tightening of fasteners 34 beads 26 are released from or firmly clamped within the respective channels 36. In practice belt 22 may be formed from a large plurality of pans 24 releasably clamped together end-to-end as described hereinabove. For added strength individual pans 24 may include molded-in reinforcements, and specifically bead portions 26 may include such molded-in reinforcements as a length of stranded wire rope 38 (FIGS. 5 and 7) or other suitable fiber reinforcement extending therewithin and cooperable with other suitable material reinforcements.

As described in the cited copending application conveyor element assembly 18 includes support means in the form of a plurality of longitudinally spaced brackets 40 secured at intervals to belt 22 (FIG. 3). Brackets 40 include guide roller means 42 adapted to be guided in the hereinabove mentioned endless guideway means 16 to guide and support conveying element assembly 18 throughout its orbital travel. As shown guide roller means 42 includes a vertical load or weight carrying roller 42a which rollingly engages a portion of guideway means 16 shown as a track 16a extending longitudinally of frame 14 and around the ends thereof. Guide roller means 42 also includes a pair of side thrust load bearing rollers 42b, c rollingly engaging respective longitudinally extending roller track portions 16b, c of guideway means 16.

For purposes of this invention it is to be noted that each bracket 40 includes a pair of relatively rotatable bracket portions which are selectively pivotable with respect to each other about a pivot axis means 44. Accordingly, all three of the described guide rollers 42a,b,c on each bracket 40 may be carried by rotary axle means affixed to one bracket portion 40a (referred to hereinafter as the guide bracket portion), and the bracket portion 40b which is pivotal with respect thereto (hereinafter the support bracket portion) carries belt 22 such that belt 22 is rotatable with respect to guide bracket portion 40a about pivot axis means 44 in the manner described hereinbelow.

Preferably brackets 40 are spaced longitudinally of belt 22 such that they coincide with the respective clamps 28 and are adapted to be releasably secured thereto as to a generally vertically extending laterally inner portion thereof whereby belt 22 is supported at least adjacent each clamp 28, and each pan 24 is thus supported at least adjacent its longitudinal ends. The longitudinally spaced brackets 40 further support and are driven in their orbital movement by an endless tension element 46 such as a drive chain to which brackets 40 are suitably secured. Chain 46 extends longitudinally adjacent guideway means 16 laterally intermediate the guideway means 16 and conveyor belt 22, and passes around drive and idler sprockets as disclosed in the cited copending application for driving of conveying element assembly 18 through its closed loop path 20.

Figure 8:
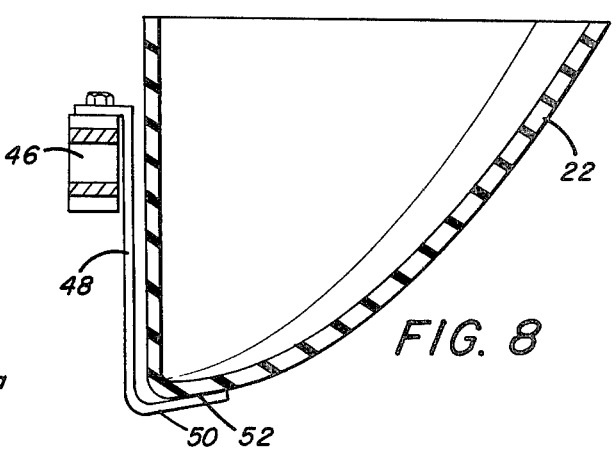
FIG. 8 is a fragmentary sectional view similar to FIGS. 2 and 3 showing a supplemental support means for the conveying member.

Intermediate the longitudinally spaced brackets 40 belt 22 may be supported by elongated supplemental support elements 48 (FIG. 8) releasably affixed to chain 46 and extending generally downwardly therefrom along an inner wall portion of belt 22 and having a lower, laterally outwardly extending support end portion 50 which underlies a lower portion 52 of the belt to support belt 22 intermediate spaced brackets 40. Supplemental support elements 48 help prevent belt sag intermediate brackets 40 which may occur due to the flexibility of pans 24 and the weight of the material carried therein.

Figure 7:
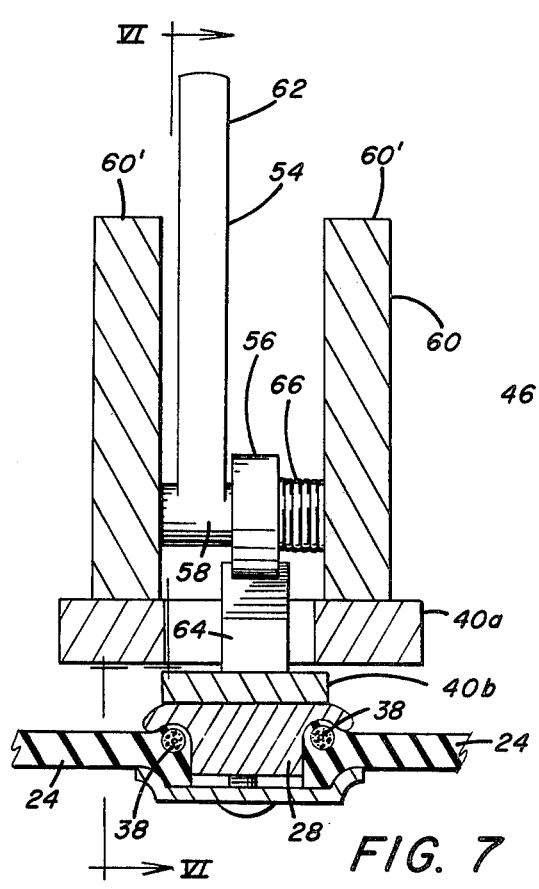
FIG. 7 is a sectional view taken on line 7—7 of FIG. 6.
Figure 6:
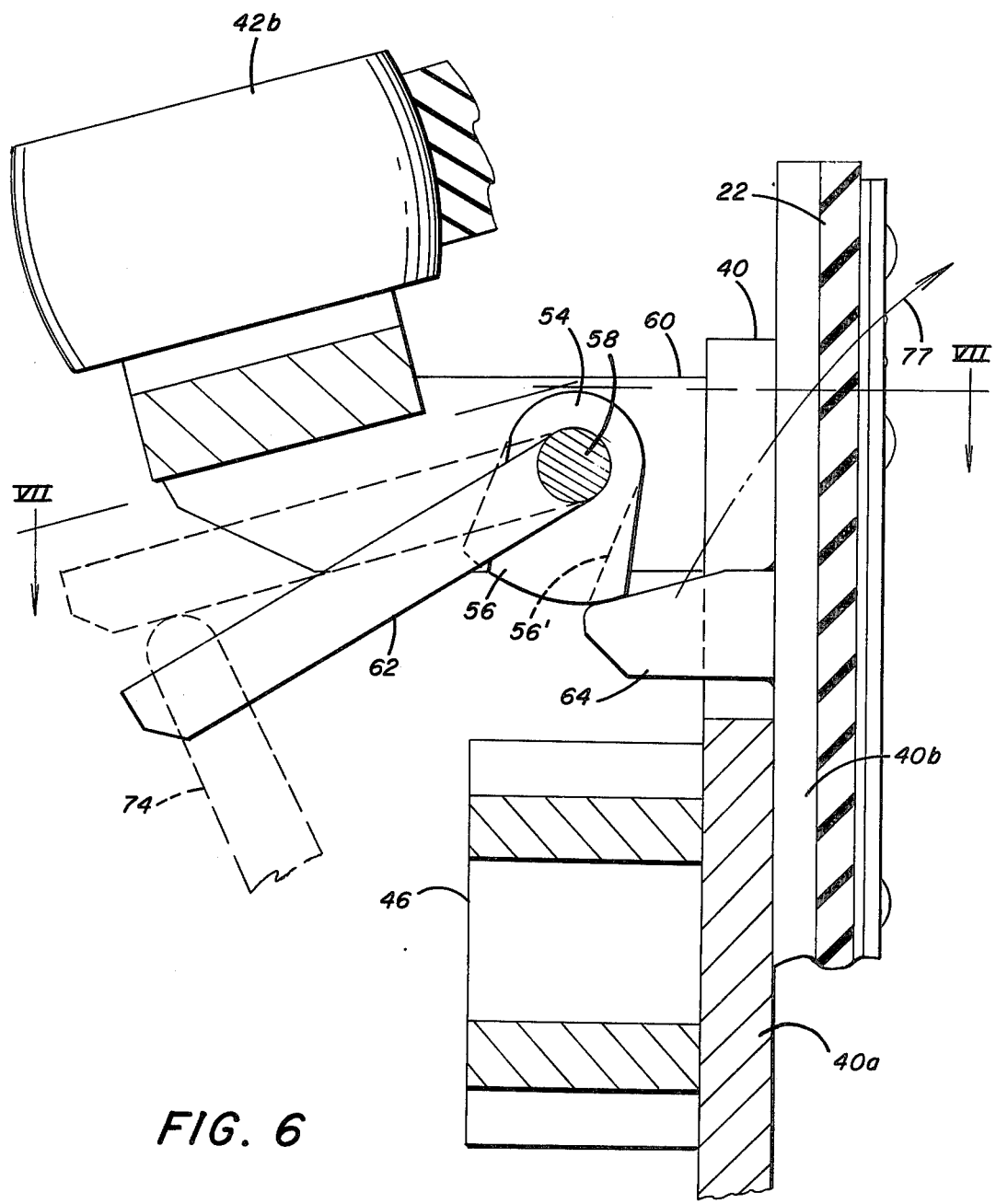
FIG. 6 is a fragmentary portion of FIG. 3 showing the discharge latch means of FIG. 3 partially sectioned on line 6—6 of FIG. 7.

As shown in FIGS. 3, 6, and 7 conveyor 10 includes discharge latch means 54 associated with ones of brackets 40 and which are selectively operable for dumping or discharge of material as follows. Each latch means 54 includes a latching element 56 pivotally affixed to a pivot axis means 58 extending intermediate the legs 60' of an inwardly extending bifurcated roller support portion 60 of each support guide portion 40a (See FIG. 7). An elongated latch actuator handle or lever 62 is rigidly affixed to axis means 58, extends transversely inwardly thereof and is engageable by suitable actuator and security cam means as described hereinbelow to move latching element 56 to disengaged or engaged positions thereof, respectively. In its closed or engaged position as shown in solid lines in FIG. 6, latch element 56 normally retains a pawl element 64 affixed to support bracket portion 40b to securely retain bracket portion 40b against rotation with respect to guide bracket portion 40a and thus retain belt 22 securely in its upright orientation. A spring bias means such as a preloaded helical spring 66 encompassing axis 58 (FIG. 7) continuously urges latching element 56 toward its engaged position. Upon movement of latching element 56 to its released or disengaged position as shown at 56' by the phantom line representation in FIG. 6, pawl 64 is released whereby support bracket portion 40b and the portion of conveyor belt 22 supported thereby are released to rotate about pivot axis 44 to the side discharge orientation shown in FIG. 2.

Twisting movement of belt 22 to its discharge orientation does not occur spontaneously inasmuch as the internal tension of the molded elastomeric pans 24 tends to retain belt 22 in its upright position. Therefore, a discharge roller means 68 is provided to guide belt 22 to the discharge orientation as it passes through discharge zone 20a. As shown in FIGS. 1 and 2 the discharge roller means includes one or more rollers 70 rotatably carried adjacent an outer lower end of a rigid support arm 72 which is rigidly carried by frame 14 adjacent discharge zone 20a. Discharge guide rollers 70 are positioned to engage the outer, bottom portion 52 of belt 22 which faces laterally inwardly when belt 22 is rotated to its full discharge orientation. Belt 22 is thus trained to pass over the discharge rollers 70 as described with contact between belt 22 and rollers 70 being maintained by the internal tension of the belt structure which tends to maintain belt 22 to its upright position. Belt 22 is thus constrained to twist or flex from its upright position to the full discharge position, thereafter returning to the upright position under the impetus of internal belt tension after passing rollers 70.

Discharge operation of the hereinabove described conveyor apparatus is as follows. The conveying element assembly 18 is driven through path 20 in the direction indicated by arrows A (FIG 1) by any suitable power means which drivingly engages chain 46. Accordingly a succession of brackets 40 continuously approaches discharge zone 20a. As each bracket 40 approaches zone 20a an elongated, longitudinally extending actuator camming means 74, which is suitably positioned adjacent an initial portion of discharge zone 20a as shown in FIG. 1, engages actuator lever 62 to disengage latch element 56 from pawl 64. Actuator cam 74 is coextensive with at least an initial portion of discharge zone 20a such that latching element 56 is maintained in its disengaged position until initial rotary movement of support bracket portion 40b has moved pawl 64 clear of latching element 56 in the direction shown by the arrow 77 in FIG. 6. Actuator lever 62 may then be released by cam 74 to allow spring 66 to return latching element 56 to its normally engaged position. As belt 22 continues its orbital travel the portion thereof within discharge zone 20a which has been unlatched for discharging rotates or twists progressively toward the full discharge position, reaching that orientation as it passes over discharge rollers 70. It is to be noted that the portions of belt 22 intermediate spaced brackets 40 merely rest atop supplemental support members 48. Thus, during discharge these portions of belt 22 rotate upwardly and outwardly from support members 48 and are not constrained against discharge rotation in any way.

As conveyor element assembly 18 continues its orbital travel the belt portions which have passed over rollers 70 progressively rotate back to the fully upright position under the impetus of internal belt tension until pawl 64 of each successive support bracket portion 40b reengages itself under the respective latching element 56 by displacing the latch element 56 against the bias of spring 66 and then allowing the latch element 56 to override and lock in pawl 64. Belt 22 is thus secured in its upright orientation until it once again approaches actuator cam 74. There may be provided a security cam means (FIG. 3) such as an elongated cam rod 78 which is engagable with lever arm 62 to preclude inadvertent disengagement of latch element 56 throughout portions of the orbital travel wherein belt 22 is intended to remain in its upright position.

According to the description hereinabove there is provided by the instant invention improved conveyor belt support and discharge means particularly well suited to a side discharging conveyor belt supported laterally outwardly adjacent a conveyor guideway means; however, notwithstanding the description hereinabove of particular preferred embodiments of the invention it is to be understood that this invention may be practiced in numerous alternative embodiments with various modifications thereto without departing from the broad spirit and scope thereof. For example various alternative support roller and bracket configurations may be employed. Other belt configurations than a deeply troughed horizontal loop conveyor belt may also be used. The particular configuration of the supplemental supports and latch assemblies may be varied within a wide design latitude and in particular, the supplemental supports 48 may be comprised of brackets affixed to the inner vertical wall of belt 22 and having an upper end portion which supportingly, releasably engages chain 46 as by hooking over the top of the chain. In addition the discharge roller means may be substituted by any suitable camming means, and the like. These and other embodiments and modifications having been envisioned and anticipated by the inventor, this invention should be interpreted as broadly as permitted by the scope of the claims appended hereto.

What is claimed is:

1. In a conveying apparatus wherein an elongated endles conveying element includes an endless flexible pan and a plurality of bracket means spaced longitudinally of the pan and supported by an endless guide means for support of the pan for orbital travel with respect to the guide means within an endless path including an elongated discharge path portion wherein a discharge means cooperates with the conveying element to move the pan to a material discharge orientation displaced from a material containing orientation thereof, and wherein an elongated flexible drive element is coextensive with at least the discharge path portion and is cooperable with the conveying element and with a motive means to drive the conveying element in its traverse of the discharge path portion and further wherein said bracket means provide a driving connection between said drive element and said pan for such driving of said conveying element and said bracket means include means continuously cooperable with said guide means and said pan for maintaining support of said conveying element with respect to said guide means throughout such orbital travel while permitting such pan to assume such material discharge orientation during its traverse of the discharge path portion the improvement comprising: other support means, than the first mentioned said bracket means spaced longitudinally along said drive means and intermediate said first bracket means; said other support means being engageable with said flexible drive element and said conveying element for support of said pan only when said pan is in such material containing orientation.

2. The improvement as claimed in claim 1 wherein said other support means are carried by said flexible drive element independently of said guide means.

3. The improvement as claimed in claim 2 wherein said drive element includes an elongated flexible tension means.

4. The improvement as claimed in claim 1 wherein such material discharge orientation of said pan is an orientation rotated laterally outward with respect to said guide means from such material containing orientation.

5. The improvement as claimed in claim 4 wherein said bracket means include pivot means for permitting such rotation of said pan between said material containing and said material discharge orientations.

6. The improvement as claimed in claim 5 wherein each of said bracket means includes a pair of relatively pivotal bracket portions secured together by said pivot means.

7. The improvement as claimed in claim 6 wherein one of said bracket portions associated with each of the respective said bracket means engages said pan and the other of said bracket portions pivotally secured to the respective said one bracket portion engages said flexible drive element and said guide means for support of said pan with respect to said guide means and to provide such driving connection between said pan and said drive element.

8. The improvement claimed in claim 4 additionally including supplemental guide means cooperable with said pan to guide said pan to said laterally outwardly rotated orientation.

9. The improvement as claimed in claim 8 wherein said supplemental guide means includes roller means cooperably engageable with said pan to guide said pan into said laterally outwardly rotated orientation.

* * * * *

UNITED STATES PATENT OFFICE
CERTIFICATE OF CORRECTION

PATENT NO. : 4,202,442

DATED : May 13, 1980

INVENTOR(S) : Joseph S. David

It is certified that error appears in the above-identified patent and that said Letters Patent are hereby corrected as shown below:

Column 5, line 38, delete "endles" and substitute —endless—.

Column 6, line 11, delete "drive means" and substitute —drive element—.

Signed and Sealed this

Twenty-sixth Day of August 1980

[SEAL]

Attest:

SIDNEY A. DIAMOND

Attesting Officer   Commissioner of Patents and Trademarks